(12) United States Patent
Laxhuber

(10) Patent No.: US 6,209,222 B1
(45) Date of Patent: Apr. 3, 2001

(54) BELT DRYER WITH CLEANING APPARATUS

(76) Inventor: Stefan Laxhuber, Huber am Ort 14, D-84513 Töging (DE)

( * ) Notice: Subject to any disclaimer, the term of this patent is extended or adjusted under 35 U.S.C. 154(b) by 0 days.

(21) Appl. No.: 09/400,306

(22) Filed: Sep. 21, 1999

(30) Foreign Application Priority Data

Sep. 25, 1998 (DE) .............................. 198 44 150

(51) Int. Cl.[7] .................................. F26B 19/00
(52) U.S. Cl. ................ 34/85; 34/623; 34/631; 34/638; 34/236; 134/129; 134/144
(58) Field of Search .............. 34/85, 623, 629, 34/630, 631, 638, 236; 134/129, 144

(56) References Cited

U.S. PATENT DOCUMENTS

| | | | |
|---|---|---|---|
| 3,810,315 | * | 5/1974 | Fleming ................. 34/160 |
| 3,938,532 | * | 2/1976 | Babunovic ............. 134/43 |
| 4,139,921 | * | 2/1979 | Kline et al. ........... 15/21 E |
| 4,498,250 | * | 2/1985 | Gageur et al. .......... 34/155 |
| 5,409,545 | * | 4/1995 | Levey et al. ........ 134/22.18 |
| 5,769,956 | * | 6/1998 | Cord et al. ............. 134/10 |

FOREIGN PATENT DOCUMENTS 4310546  4/1998 (DE) .

* cited by examiner

*Primary Examiner*—Pamela Wilson
(74) *Attorney, Agent, or Firm*—Stevens, Davis, Miller & Mosher, LLP

(57) ABSTRACT

The present invention relates to an apparatus for cleaning a belt dryer (10) with at least one belt (18) running through a drying space (17) for receiving the products to be dried, and a cleaning nozzle emitting a cleaning agent into the drying space (17) of the belt dryer (10) the apparatus includes at least one nozzle (31, 32, 33; 61) arranged for traveling in the longitudinal direction (22) and/or transverse direction (29) of the belt (18). The invention relates furthermore to a belt dryer, in the drying space (17) of which at least one traveling slide (30, 44) and/or at least one extensible arm (60) is arranged, applied to the slide or arm is at least one nozzle (31, 32, 33; 61).

21 Claims, 5 Drawing Sheets

BELT DRYER WITH CLEANING APPARATUS

FIELD OF THE INVENTION

The present invention relates to an apparatus for cleaning a belt dryer comprising at least one belt running through a drying space for receiving the products to be dried, more particularly food products treated with a sugary liquor, the invention also relating to a belt dryer incorporating the apparatus in accordance with the invention.

BACKGROUND OF THE INVENTION

Belt dryers are put to use in many fields for drying products. It is especially in food processing, but also in other fields, that sticky products very often need to be dried which results in heavy soilage of the belt dryer. Particularly in drying food products treated with a sugary liquor the belt dryer is exposed to heavily encrusted soilage at locations due to sugary solution spillage. This is why for good hygiene and to restrict soilage the belt dryer needs to be shut down and cleaned manually at regular intervals. Such a manual cleaning procedure takes up a lot of time and money. Apart from this, there is a risk of cleaning not being comprehensive.

Automatic cleaning systems are also known in the field of cleaning production piping, tanks and receptacles by stationary nozzles emitting a suitable cleaning fluid being incorporated in the vessels to be cleaned. Such stationary nozzles cannot be put to use in belt dryers. Thus, in conventional belt guidance arrangements there is hardly any possibility, nor sufficient space for providing a means of automatic cleaning. Furthermore, very large surface areas need to be cleaned in a belt dryer which would necessitate a correspondingly high number of stationary nozzles. Apart from this, the drying process would be obstructed by such an array of nozzles, since the stationary nozzles would need to be included in the drying chamber and stay there during drying. In addition, stationary nozzles require a relatively large amount of cleaning agent.

SUMMARY OF THE INVENTION

It is thus the object of the invention to provide an apparatus for cleaning a belt dryer which permits automatic, fast and reliably good cleaning by a simple design.

In accordance with the invention this object is achieved by an apparatus of the aforementioned kind in which at least one nozzle for emitting a cleaning agent into the drying space of the belt dryer is arranged for traveling in the longitudinal and/or transverse direction of the belt.

Due to the mobility of the at least one nozzle the number of nozzles needed can be considerably reduced whilst nevertheless permitting cleaning of relatively large surface areas. Furthermore, only a small amount of cleaning agent is needed. In addition to this, the nozzle can be traveled during drying to the edge of the drying space or out of the drying space altogether so as not to obstruct the drying process.

Advantageous aspects and further embodiments of the invention read from this disclosure.

In a first advantageous aspect at least one slide mounting the at least one nozzle is provided for traveling in the longitudinal direction of the belt, to thus achieve reliably good cleaning over the full length of the belt.

Advantageously, for supplying the cleaning agent a hose is provided secured by one end to the slide and by its other end to an automatic hose reeler to thus achieve simple supply of the cleaning agent irrespective of the position of the slide.

In accordance with another advantageous aspect the at least one slide is connected to a drive means, more particularly a ribbed drive belt, for movement in the longitudinal direction of the product belt. The drive for the drive means may then be configured fixed so that the moved mass is reduced, this in addition simplifying the design.

In a first advantageous further embodiment several slides are provided connected to a common drive means so that the slides can then be moved in unison and simultaneously with a single drive.

In a second advantageous further embodiment several slides are provided, each of which comprises its own drive means for movement in the longitudinal direction of the belt to thus achieve precise positioning of each slide irrespective of the position of any other slide.

Advantageously, at least one first slide is arranged above the belt and at least one further slide below the belt, the belt then being cleaned on both sides by these slides. Arranging the slides above and below the belt also improves cleaning the drying space.

In accordance with yet another advantageous aspect the at least one slide comprises mounting rollers and is arranged transversely to the belt in the drying space of the belt dryer. The rollers are preferably rotatably mounted on the slide and require no maintenance. Arranging the slide transversely permits cleaning the belt over its full width whilst cleaning the slide guide and the slide itself.

In another advantageous further embodiment the rollers are accommodated in an interspace between labyrinth packing plates of the belt dryer, running along the side edges of the at least one belt, and one sidewall of the belt dryer, the rollers thereby being reliably protected from soilage by the labyrinth packing plates. The additional expense required in this design is minor since such labyrinth packing plates are already incorporated in known belt dryers.

Advantageously, the rollers are supported by a supporting plate secured to the sidewall of the belt dryer or by one leg of a labyrinth packing plate, this involving only minor modifications to the design of the labyrinth packing plates.

In still another further embodiment the interspace is sealed off from the drying space of the belt dryer by sealing elements to thus furthermore reduce the risk of the rollers being soiled. In addition, the sealing elements prevent ingress of the products to be dried into the interspace which is difficult to clean.

Advantageously, the hose and the drive means are accommodated in the interspace to thus prevent soilage of these components essential to the cleaning of the belt dryer.

In accordance with still another advantageous further embodiment the rollers are supported on the surfaces of the labyrinth packing plates of the belt dryer running along the side edges of the at least one belt. Doing away with supporting plates reduces the number of components needed.

In yet a further embodiment the surfaces are configured inclined towards the middle of the belt and the rollers configured tapered to conform with the inclination of the surfaces. By inclining the surfaces and selecting the rollers tapered automatic centering of the slide is achieved with no need for additional guide elements.

In accordance with yet another advantageous aspect at least one nozzle is arranged in a belt interior space between an upper run and lower run of the belt, this nozzle permitting reliably good cleaning of the belt interior space.

To advantage, at least one nozzle is mounted on an extensible arm, by means of which the nozzle can be moved into the belt interior space to thus enhance cleaning efficiency.

In still a further advantageous aspect at least one nozzle is configured rotatable. Employing rotatable nozzles enhances cleaning efficiency and reduces the number of nozzles needed overall.

The invention also relates to a belt dryer comprising an apparatus of the present invention for cleaning the belt dryer.

BRIEF DESCRIPTION OF THE DRAWINGS

The invention will now be detailed by way of example embodiments as illustrated schematically in the drawings in which.

DETAILED DESCRIPTION OF THE PREFERRED EMBODIMENTS

Figure 1:
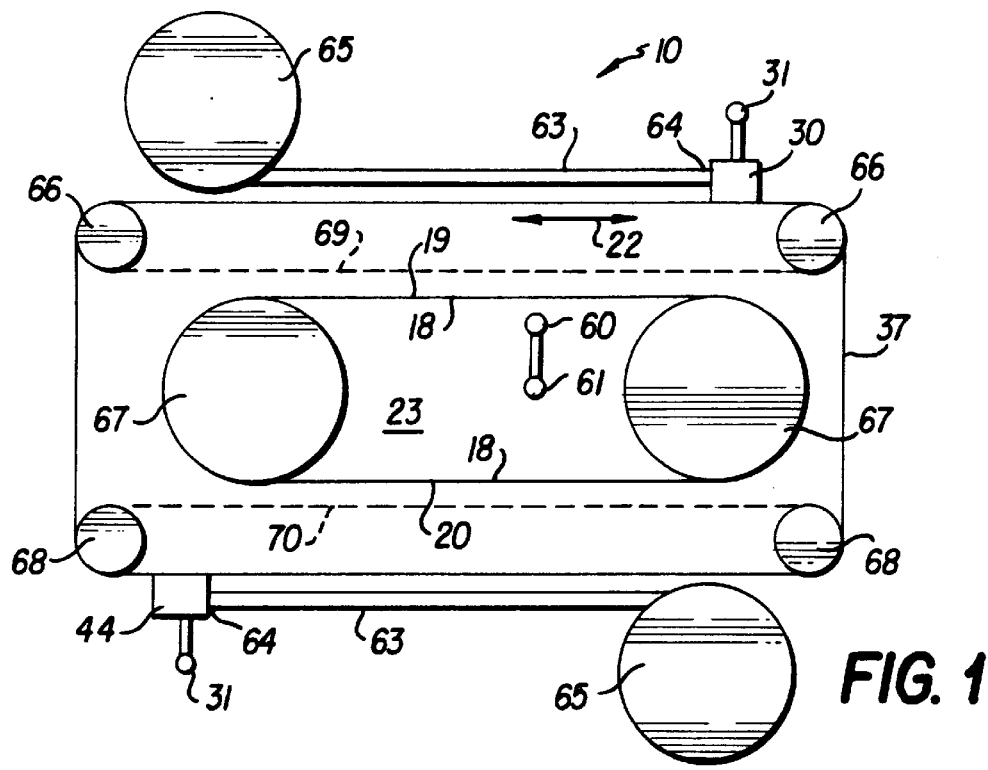
FIG. 1 is a schematic illustration of the drive concept of a belt dryer in accordance with the invention in longitudinal section.

Referring now to FIG. 1 there is illustrated schematically the drive concept of a belt dryer 10 in accordance with the invention in longitudinal section. The belt dryer 10 comprises a circulating belt 18 having an upper run 19 and a lower run 20. For guiding and driving the belt 18 guide pulleys 67 are provided. Formed between the upper run 19 and the lower run 20 is a belt interior space 23. Accommodated in the belt interior space 23 is an extensible arm 60 with a nozzle 61. The arm 60 and the nozzle 61 serve to clean the belt interior space 23. As an alternative, a guiding arrangement of four guide pulleys 67 may be provided.

Arranged above the belt 18 is a first slide 30 incorporating a nozzle 31. For the supply of the cleaning agent a hose 63 is employed which is secured at its one end 64 to the slide 30. The other end of the hose 63 is connected to an automatic hose reeler 65. Provided below the belt 18 is a further slide 44, likewise comprising a nozzle 31 and connected by a hose 63 for the supply of cleaning agent. The slides 30, 44 together with the nozzles 31 mounted thereon may be traveled in the longitudinal direction 22 of the belt 18, the hose 63 being automatically taken up or dispensed by the corresponding hose reel 65 on movement of the slides 30, 44.

The slides 30, 44 together with the nozzles 31 mounted thereon serve to clean the belt 18 and further components (not shown in FIG. 1) of the belt dryer 10.

In a first aspect of the drive concept it is provided for that both slides 30, 44 are connected to a common ribbed drive belt 37. This ribbed drive belt 37 runs over pairs of guide rollers 66, 68. In this drive concept the slides 30, 44 are traveled simultaneously and opposingly in the longitudinal direction 22. To prevent tilting, several ribbed drive belts 37 may be provided juxtaposed.

In another drive concept it is provided for that a separate ribbed drive belt 69, 70 exists for each slide 30, 44. The upper ribbed drive belt 69 is indicated by the broken lines and wraps the guide rollers 66. The lower ribbed drive belt 70 is likewise indicated in broken lines and wraps the guide rollers 68. The slides 30, 44 can thus be moved and positioned each independently of the other.

At least one of the guide rollers 66, 68 is connected to a motor (not shown) for powering the slides 30, 44. The belt 18 is powered via one of the guide pulleys 67.

Figure 2:
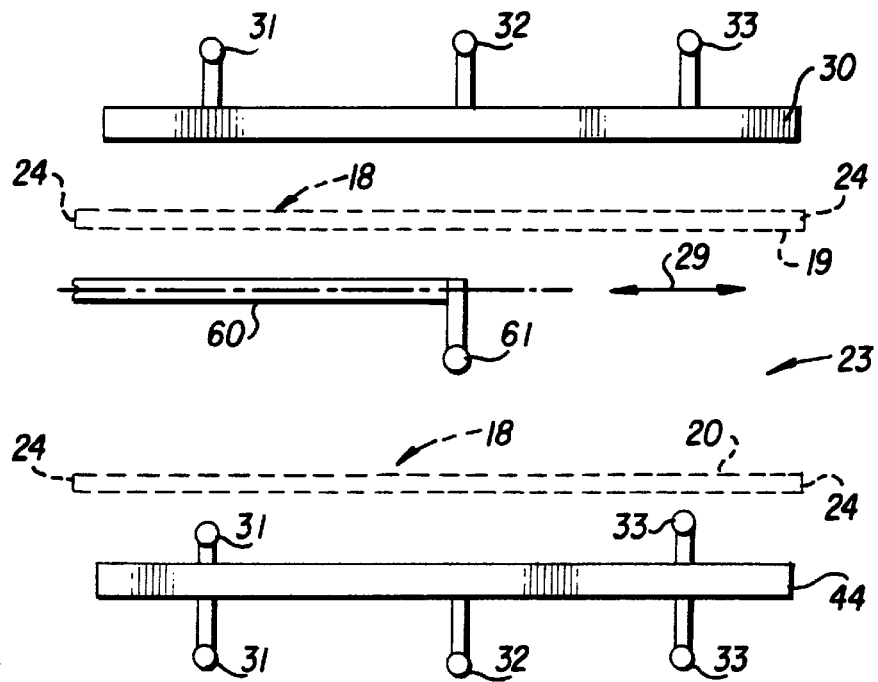
FIG. 2 is a schematic illustration of the cleaning concept of the belt dryer in accordance with the invention in cross-section.

Referring now to FIG. 2 there is illustrated schematically the cleaning concept of the belt dryer 10 in accordance with the invention in cross-section. Both slides 30, 44 extend in the transverse direction 29 of the belt 18 up to the vicinity of the side edges 24 of the belt 18. Each slide 30, 44 comprises several nozzles 31, 32, 33. The nozzles 31, 32, 33 of the upper slide 30 face away totally from the belt 18. The lower slide 44 comprises nozzles 31, 32, 33 on both sides. Both slides 30, 44 may be traveled in the longitudinal direction of the belt 18.

Schematically illustrated in the belt interior space 23 is a traveling arm 60 with the nozzle 61. The nozzle 61 can be traveled by means of the arm 60 in the transverse direction 29 of the belt 18. In this arrangement the nozzle 61 is configured the same as the other nozzles 31, 32, 33. As an alternative a special nozzle shape may be provided. This cleaning concept permits cleaning the belt 18 and further parts of the belt dryer 10 including the slides 30, 44, whilst the belt interior space 23 may be simultaneously cleaned with the arm 60 and the nozzle 61. Soilage and encrustations are thus reliably removed.

Figure 3:
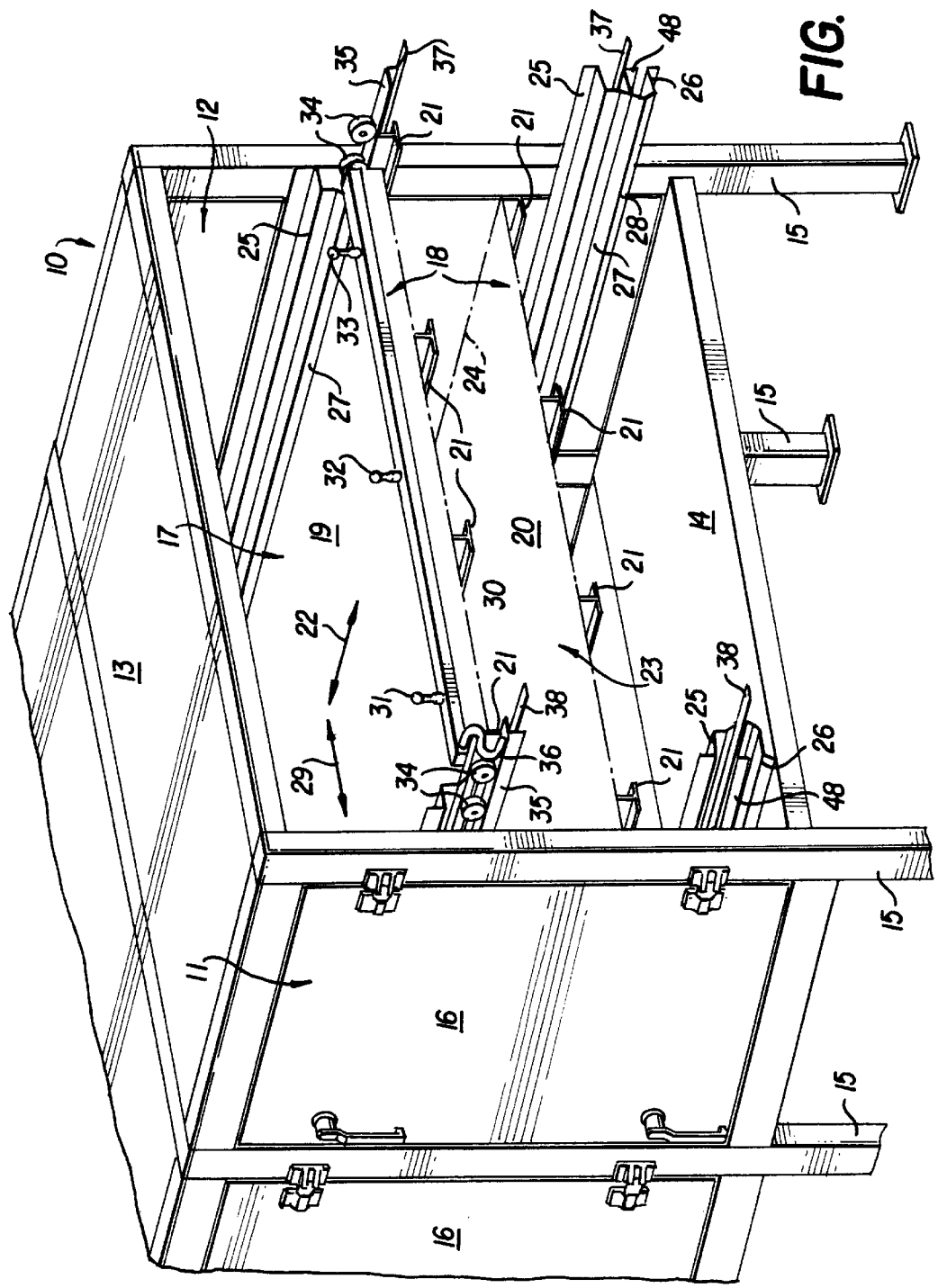
FIG. 3 is a schematic perspective illustration of a belt dryer in accordance with the invention employing the apparatus in accordance with the invention.

Referring now to FIG. 3 there is illustrated in perspective a belt dryer 10. The belt dryer 10 comprises two sidewalls 11, 12, a cover plate 13 and a bottom plate 14 and is floor-mounted on supports 15. Provided in the sidewalls 11, 12 are access doors 16 permitting access to the drying space 17. Arranged in the drying space 17 is a circulating belt 18 having an upper run 19 and a lower run 20. The belt 18 is supported by several skid rails 21 oriented in the longitudinal direction of the belt 18. Formed between the upper run 19 and the lower run 20 is the belt interior space 23 as part of the drying space 17.

The belt 18 consists either of individual plate slats or of an endless belt of fabric, stainless steel or plastics. Its support may also be formed by supporting rollers (not shown). As an alternative the belt 18 may be supported at its side edges 24 by a chain and by cross-members.

Arranged along the side edges 24 of the belt 18 at the sidewalls 11, 12 of the belt dryer 10 are labyrinth packing plates 25, 26. The labyrinth packing plate 25 is arranged directly above the upper run 19 and comprises a sealing lip 27 in contact with the upper run 19. Provided below the lower run 20 and spaced away therefrom is a further labyrinth packing plate 26 which cooperates with a labyrinth packing plate 25. The labyrinth packing plate 26 comprises a sealing lip 28, too.

The upper labyrinth packing plate 25 serves to laterally seal off the upper run 18 and mount the first slide 20. The two lower labyrinth packing plates 25, 26 are provided for mounting the further slide 44 (not shown in FIG. 3).

The products to be dried are applied to the upper run 19 of the belt 18. In this arrangement the belt 18 moves in its longitudinal direction 22 and is fixed in the transverse direction 29. To accelerate drying, the drying space 17 may be charged with hot air or some other suitable medium. Side spillage of the products is prevented by the labyrinth packing plate 25.

During drying, the belt 18 becomes soiled. This soilage may also contaminate the labyrinth packing plate 25, the sidewalls 11, 12 and the bottom plate 14. For good hygiene and to prevent excessive soilage the belt dryer 10 is provided with a cleaning apparatus.

This cleaning apparatus comprises the slide 30 arranged above the belt 18 and traveling in the longitudinal direction 22 thereof. The slide 30 runs in the transverse direction 29 of the belt 18 and comprises three nozzles 31, 32, 33. The slide is mounted on rollers 34 supported by a supporting plate 35 secured to the sidewalls 11, 12 of the belt dryer 10. For the supply of cleaning agent the slide 30 comprises a hose connector 36. Ribbed drive belts 37,38 running along the sidewalls 11, 12 serve the drive.

For cleaning, the slide 30 is traveled in the longitudinal direction 22 by means of the ribbed drive belts 37, 38, it thereby being supported by its rollers 34 on the supporting plates 35. The supply of the cleaning agent is made via the hose connector 36. Preferably the slide 30 is traveled over the full length of the upper run 19. On completion of cleaning it is traveled to the edge of the drying space 17 or removed totally from the drying space 17. On completion of cleaning, drying may be continued without being obstructed by the slide 30.

Figure 4:
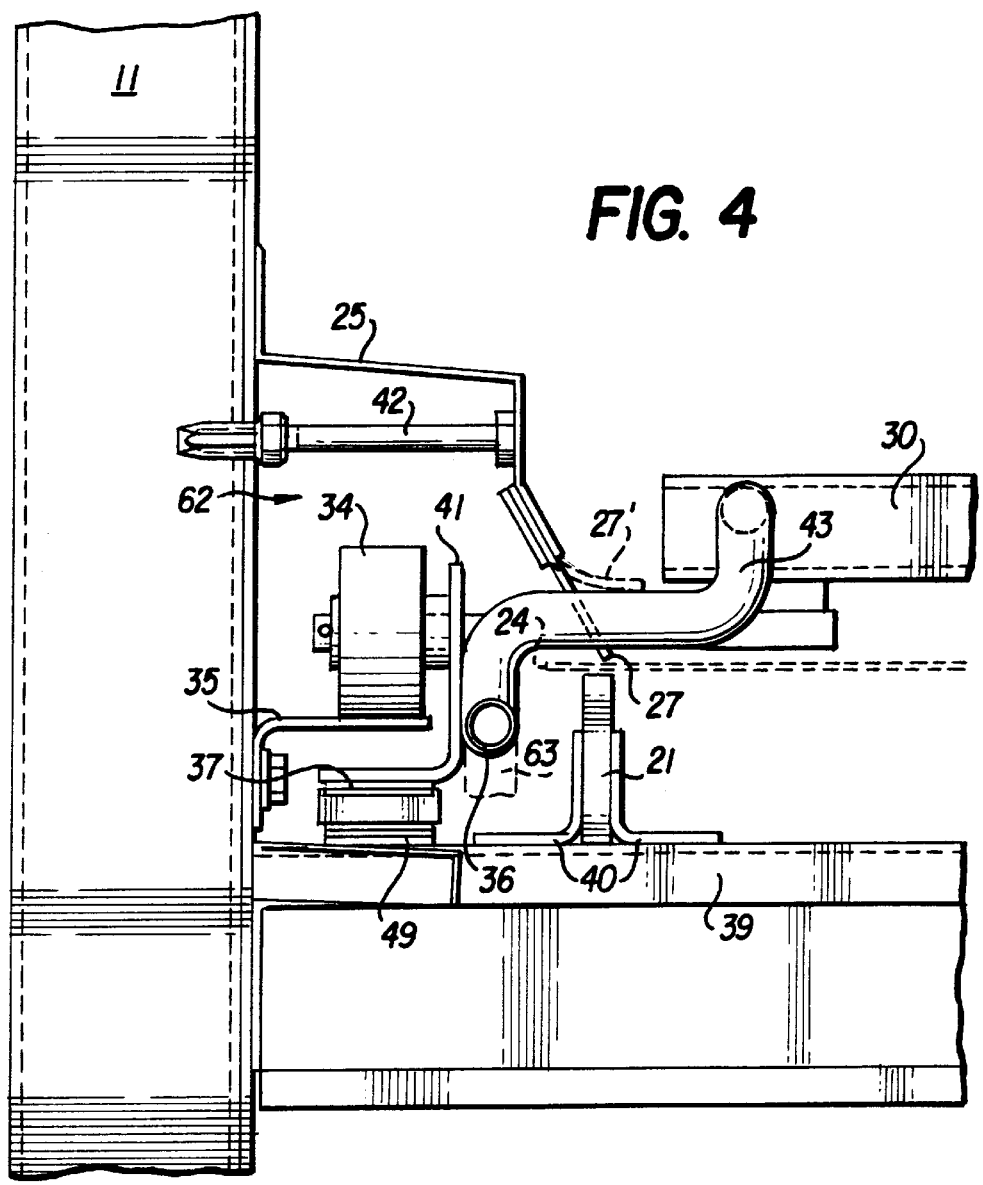
FIG. 4 is a section taken through the mount of a slide arranged above the belt in a first embodiment.

Referring now to FIG. 4 there is illustrated a section through a first embodiment of a mounting arrangement of the slide 30. The mounting arrangement of the slide 30 on the opposite side of the belt dryer 10 is configured mirror-inverse. The rollers 34 are supported by the supporting plates 35 secured to the sidewall 11 of the belt dryer 10. An angle bracket 41 of the slide 30 serves to connect the ribbed drive belt 37, the angle bracket underclasping the supporting plate 35. Provided below the ribbed drive belt 37 is a support 49, this support 49 preventing damage to the ribbed drive belt 37.

A supporting plate 39 is provided with angle brackets 40 for mounting the skid rails 21. Preferably the supporting plate 39 does not extend over the full length of the belt 18, it instead extending only sectionwise in the transverse direction 29. The labyrinth packing plate 25 is stiffened by a supporting bolt 42 to prevent unwanted deformation, it furthermore comprising a sealing lip 27 which in the non-deformed position is in contact with the upper side of the upper run 19 so that the intermediate space 62 between the labyrinth packing plate 25 and the sidewall 11 is protected from soilage. Serving the supply of the cleaning agent is the hose 63 indicated by the broken lines, connected to the hose connector 36. The cleaning agent is furthermore supplied via a port 43.

The rollers 34, the ribbed drive belt 37 and the hose 63 are accommodated in the intermediate space 62 and are thus protected from soilage. In the cleaning action the sealing lip 27 is swept up from the port 43 in the region of the slide 30 into its position 27' as shown by the broken lines. In the remaining regions the sealing lip 27 remains unchanged in contact with the surface of the upper run 19, thus achieving protection of the intermediate space 62 and of the components 34, 37, 63 accommodated therein from soilage also during cleaning.

Figure 5:
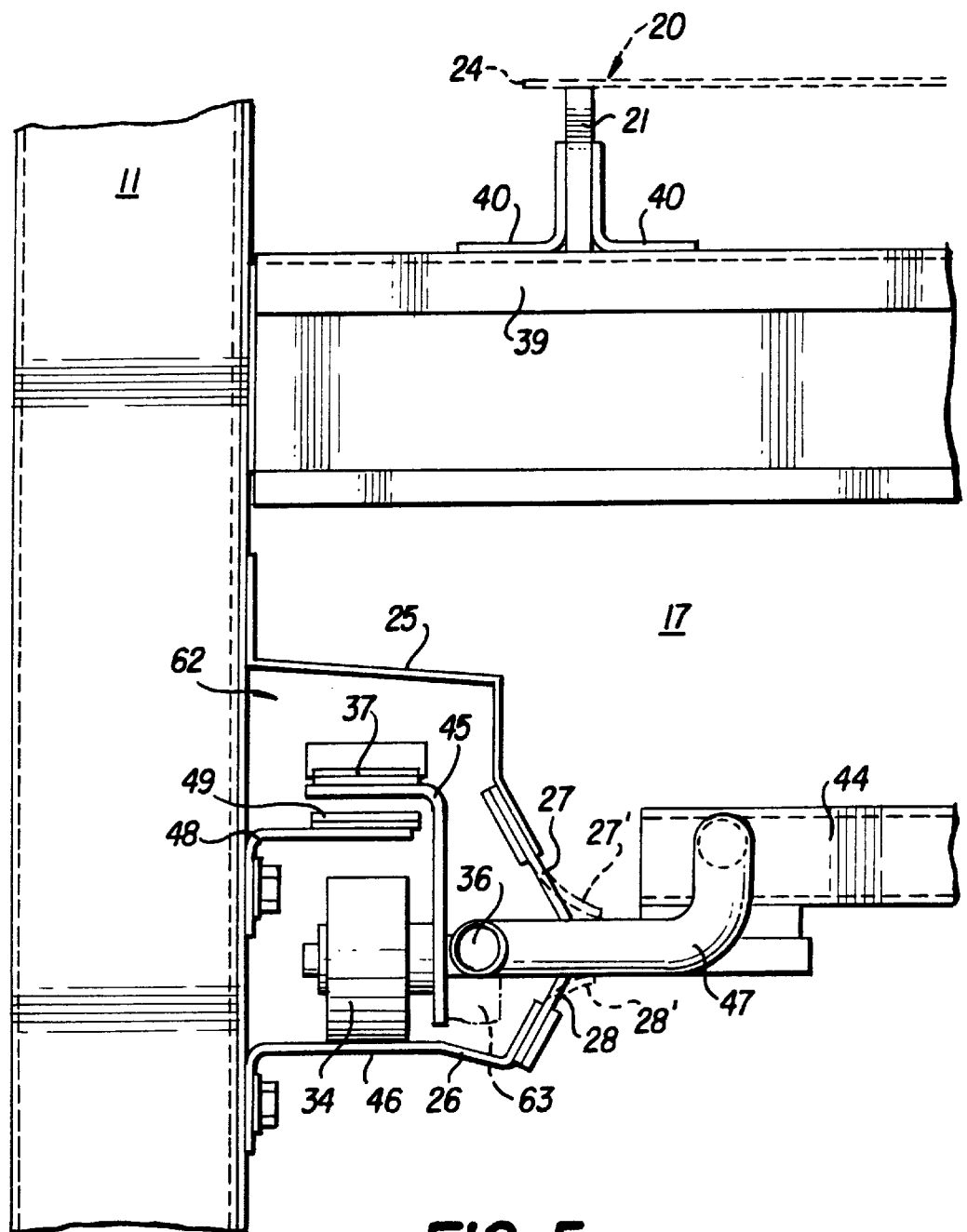
FIG. 5 is a section taken through the mount of a slide arranged below the belt in the embodiment as shown in FIG. 4.

Referring now to FIG. 5 there is illustrated a section through the mount of a lower slide 44 in the aspect similar to that as shown in FIG. 4. The slide 44 is arranged below the lower run 20 and below the further skid rails 21 as well as supporting plates 39. The rollers 34 of the slide 44 are supported by one leg 46 of the lower labyrinth seal plate 26. Serving to secure the ribbed drive belt 37 to the slide 44 is an angle bracket 45 engaging a further supporting plate 48. The supporting plate 48 is in turn provided with a support 49 for protecting the ribbed drive belt 37. The supply of the cleaning agent is made via the hose 63 indicated by the broken lines, connecting the hose connector 36, a port 47 being provided for passing on the cleaning agent.

The intermediate space 62 between the labyrinth packing plates 25, 26 and the sidewall 11 is sealed off by sealing lips 27, 28. During drying, these sealing lips 27, 28 more or less come into contact with each other. During cleaning the slides 27, 28 are locally deformed from the port 47 into their position 27', 28' to thus provide very good protection of the intermediate space 62 from soilage also during cleaning.

Figure 6:
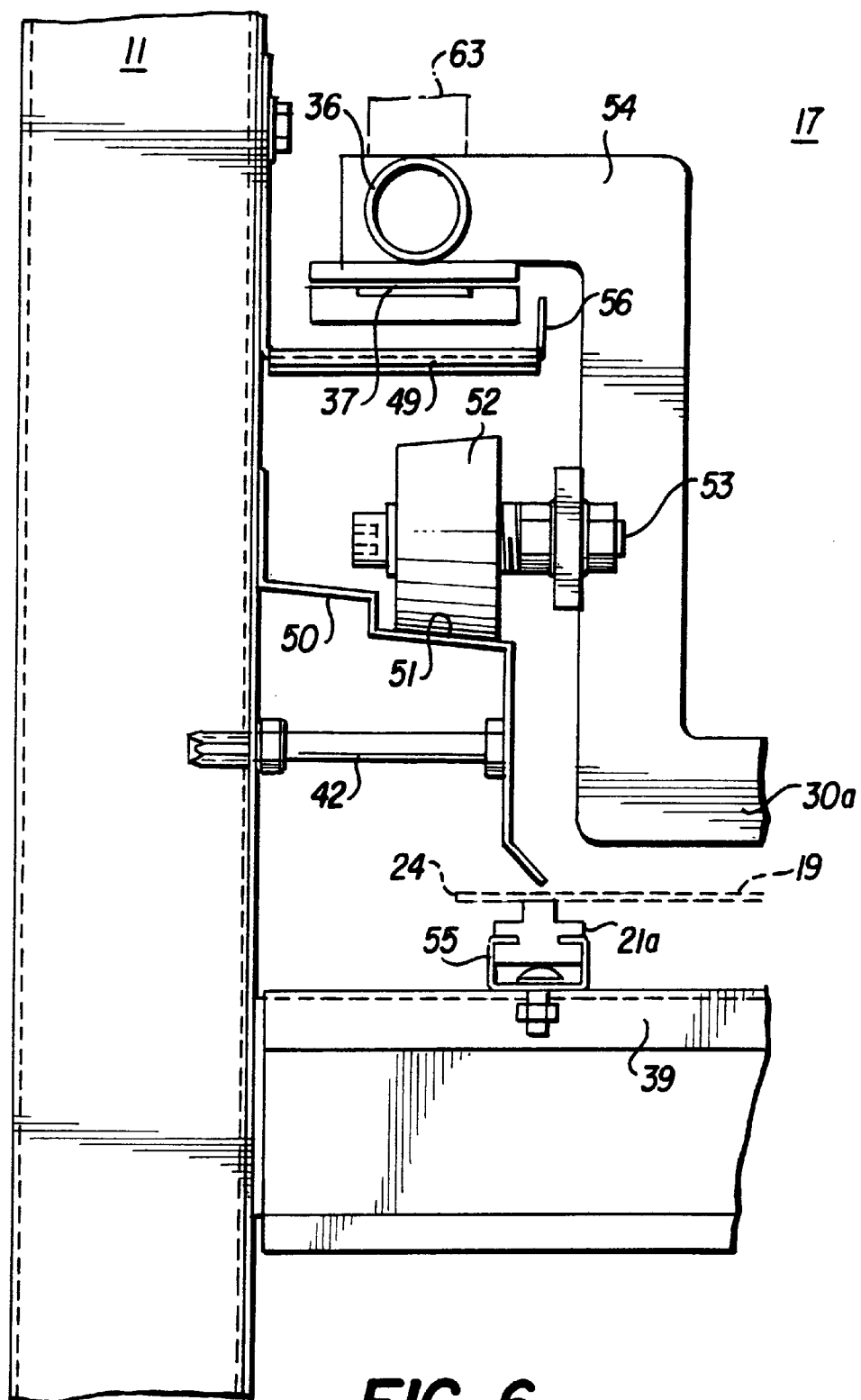
FIG. 6 is a view similar to that as shown in FIG. 4 showing a further embodiment.

Referring now to FIG. 6 there is illustrated yet another embodiment of a mounting arrangement in a view similar to that as shown in FIG. 4. Secured to the sidewall 11 is a labyrinth packing plate 50 which is stiffened by a supporting bolt 42. The labyrinth packing plate 50 comprises a surface 51 inclined towards the middle of the belt 18. This surface 51 serves to support tapered rollers 52 of the slide 30a. In this arrangement the surface 51 and the rollers 52 are made to conform so that the axis of rotation 53 of the rollers 52 is oriented substantially horizontal and parallel to the upper run 19 of the belt 18. Due to the inclination of the surfaces 51 and the taper conformity of the rollers 52 automatic centering of the slide 30a is achieved. No sealing lips are needed on the labyrinth packing plate 50.

The upper run 19 of the belt 18 is supported by the skid rails 21 a secured to the supporting plates 39 by means of clamps 55. As an alternative, supporting rollers or a chain guide may be provided.

Serving to move the slide 30a is again a ribbed drive belt 37. The supply of the cleaning agent is made via the hose 63 indicated by the broken lines and a port 54. For protecting the ribbed drive belt 37 a catchment plate 56 is provided which underclasps the ribbed drive belt 37. The catchment plate 56 is in turn provided with a support 49 for the ribbed drive belt 37.

Figure 7:
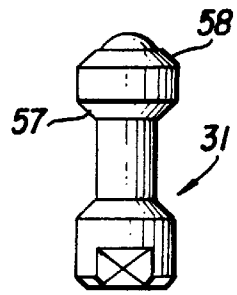
FIG. 7 is a magnified illustration of a nozzle.

Referring now to FIG. 7 there is illustrated a nozzle 31 on a magnified scale. The nozzle 31 comprises two orifices 57, 58 located diagonally opposed. In this arrangement the orifices 57, 58 are configured so that on emerging the cleaning agent causes the nozzle 31 to rotate. No additional drive is needed to rotate the nozzle 31. It is this rotation of the nozzle 31 in conjunction with the orifices 57, 58 being located diagonally opposed that makes effective cleaning of the drying space 17 possible with but a few nozzles 31. The further nozzles 32, 33 are advantageously configured the same as nozzle 31.

Figure 8:
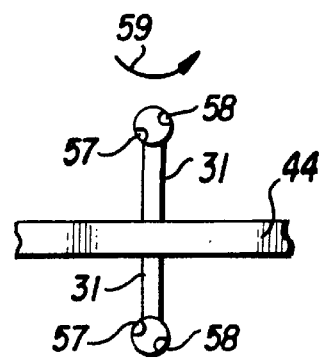
FIG. 8 is a detail of the slide arranged below the belt including the nozzles arranged thereon.

Referring now to FIG. 8 there is illustrated schematically a nozzle array. The slide 44 is provided on both sides with nozzles 31, each of which comprises the orifices 57, 58. In this arrangement the upper nozzle 31 is mounted rotatable in the direction 59 on the slide 44 whilst the lower nozzle 31 is rigidly connected to the slide 44.

During drying, the slides 30, 44 are traveled up to or beyond the edge of the drying space 17 so as to be no obstacle to drying. For cleaning, the slides 30, 44 are traveled in the longitudinal direction 22 of the belt 18 to thereby clean the drying space 17. For cleaning the belt interior space 23 the extensible arm 60 is provided with the nozzle 61. On completion of cleaning, the slides 30, 44 are returned to the edge of the drying space 17 to thus permit a smooth continuation of the drying action. All in all, speedy and reliable means for cleaning are thus provided for a simple design and but a few nozzles.

What is claimed is:

1. A belt driver comprising:
   a drying space for receiving a product to be dried; a drying belt;
   a belt drive mechanism for running said drying belt through said drying space;
   at least one cleaning nozzle, connected to a source of cleaning agent, for emitting a cleaning agent into at least said drying space for cleaning at least said drying belt:
   a nozzle drive mechanism functionally attached to said belt dryer and functionally connected to said cleaning nozzle, said drive mechanism allows said cleaning nozzle to travel along at least one member of the group consisting of the longitudinal and transverse direction of said drying belt.

2. The belt dryer of claim 1, wherein at least one slide mounting said cleaning nozzle is provided for traveling in said longitudinal direction of said drying belt.

3. The belt dryer of claim 2, wherein for supplying said cleaning agent to said cleaning nozzle a hose is provided secured by one end to said slide and by its other end to an automatic hose reeler.

4. The belt dryer of claim 2, wherein said nozzle drive mechanism comprises a ribbed drive belt for movement of said cleaning nozzle in said longitudinal direction of said drying belt.

5. The belt dryer of claim 2, wherein a plurality of said slides is functionally connected to said nozzle drive mechanism.

6. The belt dryer of claim 2, wherein each of said slides comprises its own drive means for movement in the longitudinal direction of said drying belt.

7. The belt dryer of claim 2, wherein at least one of said slides is arranged above said drying belt and at least one of said slides is arranged below said drying belt.

8. The belt dryer of claim 3, wherein said slide comprises mounting rollers and is arranged in the transverse direction of said drying belt.

9. The belt dryer of claim 8, wherein said rollers are located in an interspace between labyrinth packing plates of said belt dryer, running along a side edge of said drying belt and a sidewall of said belt dryer.

10. The belt dryer of claim 9, wherein said rollers are supported by the members selected from the group consisting of a supporting plate secured to said sidewall of said belt dryer and one leg of said labyrinth packing plate (26).

11. The belt dryer of claim 9, wherein said interspace is sealed off from said drying space of said belt dryer by sealing elements.

12. The belt dryer of claim 9, wherein said hose and said nozzle drive mechanism are located in said interspace.

13. The belt dryer of claim 9, wherein said rollers are supported on the surfaces of said labyrinth packing plates.

14. The belt dryer of claim 13, wherein said surfaces are configured inclined towards the middle of said drying belt and said rollers are configured tapered to conform with the inclination of said surfaces.

15. The belt dryer of claim 1, wherein at least one of said cleaning nozzle is arranged in a belt interior space between an upper run and a lower run of said drying belt.

16. The belt dryer of claim 15, wherein at least one of said cleaning nozzle is mounted on an extensible arm.

17. The belt dryer of claim 1, wherein at least one of said cleaning nozzle is configured rotatable.

18. The belt dryer of claim 1, wherein said products to be dried are food products treated with a sugary liquor.

19. The belt dryer of claim 1, wherein said at least one cleaning nozzle may travel only in one direction from the group consisting of the longitudinal and transverse direction of said drying belt.

20. The belt dryer of claim 1, wherein at least one of said at least one cleaning nozzle directs cleaning agent downwardly.

21. The belt dryer of claim 20, wherein the cleaning nozzle that directs cleaning agent downwardly is attached to said belt dryer above said drying belt.

* * * * *